United States Patent Office 2,945,047
Patented July 12, 1960

2,945,047

THIOSEMICARBAZIDES

William R. Sherman, Waukegan, Ill., assignor to Abbott Laboratories, North Chicago, Ill., a corporation of Illinois No Drawing. Filed Dec. 29, 1958, Ser. No. 783,163

5 Claims. (Cl. 260—347.2)

The present invention relates to the thiosemicarbazides corresponding to the formula:

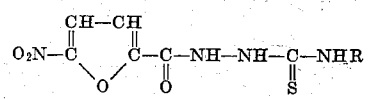

In this and succeeding formulas, R represents hydrogen, aryl, such as phenyl or lower alkyl containing from 1 to 4 carbon atoms, inclusive. These new compounds are crystalline solids which are quite soluble in many organic solvents, but substantially insoluble in water. They have been found to be active as parasiticides and in particular as antibacterial agents for the control of the growth of bacteria such as *Micrococcus pyogenes* var. *aureus* and *Salmonella typhimurium*. The compounds are also valuable as intermediates for the preparation of the corresponding thiadiazoles.

The new compounds may be prepared by the reaction of 5-nitro-2-furoylhydrazide and an isothiocyanate corresponding to the formula RSCN. Good results are obtained when employing substantially equimolecular proportions of the reactants. The reaction takes place smoothly at a temperature of from 10° C. to 80° C. and preferably at the boiling temperature of the reaction mixture with the formation of the desired product. Upon completion of the reaction, the mixture is cooled to precipitate the desired thiosemicarbazide which is separated and purified from a suitable organic solvent.

In carrying out the reaction, the 5-nitro-2-furoylhydrazide and isothiocyanate are mixed with a suitable solvent such as ethanol and the resulting mixture heated preferably at the boiling temperature and under reflux for a period of time to complete the reaction. Upon cooling the reaction mixture, the desired thiosemicarbazide product precipitates as a crystalline solid. The solid product is thereafter removed by filtration or other conventional means and purified by recrystallization from a suitable solvent such as ethanol or an acetone-water mixture.

In an alternative method of preparation, 1-(5-nitro-2-furoyl)-thiosemicarbazide may be prepared by the reaction of thiosemicarbazide and 5-nitro-2-furoylchloride. The reaction is carried out in the presence of an inert solvent such as dioxane. Good results are obtained when employing substantially equimolecular proportions of the reactants. The reaction takes place smoothly at temperatures of from 10° C. to 80° C. with the formation of the desired product and hydrogen chloride of reaction. In carrying out the reaction, the 5-nitro-2-furoylchloride dissolved in a suitable solvent is added portionwise with stirring to a suspension of thiosemicarbazide and an acid binding agent such as an alkali metal bicarbonate, preferably sodium bicarbonate, in the same reaction solvent. The reaction mixture is then stirred for a period of time at room temperature and thereafter heated to about 70° C. to complete the reaction. Upon completion of the reaction, the reaction mixture is cooled and filtered and the solvent evaporated from the filtrate. Alcohol is then added to precipitate the desired product as a crystalline solid which is separated and recrystallized from ethanol or some other suitable organic solvent.

The following examples illustrate the invention, but are not to be construed as limiting.

EXAMPLE I

*1-(5-nitro-2-furoyl)-thiosemicarbazide*

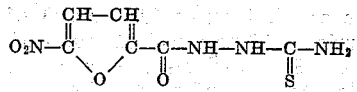

5-nitro-2-furoylchloride (5.27 grams, 0.03 mole) was dissolved in dry dioxane and the resulting solution added slowly with stirring to a mixture of thiosemicarbazide (2.73 grams, 0.03 mole) and 7 grams of sodium bicarbonate in dry dioxane. The reaction mixture was stirred for two hours at room temperature and thereafter heated on a steam bath for 10 minutes. After cooling the mixture, it was filtered and the solvent partially evaporated from the filtrate. A sufficient amount of ethanol was then added to precipitate the desired 1-(5-nitro-2-furoyl)-thiosemicarbazide as a yellow solid. This product was separated by filtration and recrystallized from ethanol. It melted at 192° C. with decomposition and was found to contain 31.45% carbon, 2.97% hydrogen and 24.32% nitrogen compared to the calculated values of 31.31%, 2.63% and 24.35%, respectively.

In another method of preparation, a mixture containing 34.22 grams, (0.20 mole) of 5-nitro-2-furoyl-hydrazide, 25 grams (0.26 mole) of potassium thiocyanate, 20 milliliters of concentrated hydrochloric acid and 300 milliliters of water was heated on a steam bath for a period of 4 hours. Upon cooling the reaction mixture, the desired 1-(5-nitro-2-furoyl)-thiosemicarbazide precipitated. The solid product was separated by filtration and purified by washing with boiling ethanol.

EXAMPLE II

*4-methyl-1-(5-nitro-2-furoyl)-thiosemicarbazide*

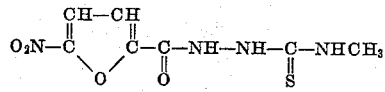

A solution containing 17.11 grams (0.10 mole) of 5-nitro-2-furoylhydrazide and 8.04 grams (0.11 mole) of methylisothiocyanate in 250 milliliters of ethanol was heated at the boiling temperature and under reflux for a period of 2 hours. Upon cooling the reaction mixture, a solid precipitated which was separated by filtration, crystallized from ethanol and thereafter dried under a vacuum at 100° C. As a result of these operations, there was obtained 4-methyl-1-(5-nitro-2-furoyl)-thiosemicarbazide as a white crystalline solid melting at 190° C. with decomposition. This product contained 34.47% carbon, 3.27% hydrogen and 22.72% nitrogen compared to the calculated values of 34.43%, 3.30% and 22.95%, respectively.

EXAMPLE III

*4-ethyl-1-(5-nitro-2-furoyl)-thiosemicarbazide*

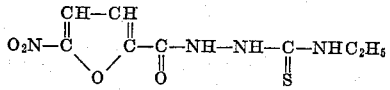

A solution containing 17.11 grams (0.10 mole) of 5-nitro-2-furoylhydrazide and 9.59 grams (0.11 mole) of ethylisothiocyanate in 250 milliliters of ethanol was heated at the boiling temperature and under reflux for a period of 2 hours. The reaction mixture was then cooled to precipitate the desired 4-ethyl-1-(5-nitro-2-furoyl)-thiosemicarbazide product which was separated by filtration and crystallized from ethanol. This product was a yellow crystalline solid which melted at 193° C. It contained 37.49% carbon and 4.26% hydrogen compared to the calculated values of 37.21% and 3.90%, respectively.

EXAMPLE IV

*4-phenyl-1-(5-nitro-2-furoyl)-thiosemicarbazide*

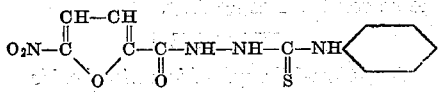

A mixture of 17.11 grams (0.10 mole) of 5-nitro-2-furoylhydrazide, 14.90 grams (0.11 mole) of phenylisothiocyanate and 350 milliliters of ethanol was heated at the boiling temperature and under reflux for a period of 30 minutes. The reaction mixture was then cooled to precipitate a solid product. This product was separated by filtration and recrystallized from an acetone-water mixture. As a result of these operations, there was obtained a 4-phenyl-1-(5-nitro-2-furoyl)-thiosemicarbazide product as a yellow-green crystalline solid which melted at 175° C. with decomposition. It was found to contain 47.13% carbon, 3.48% hydrogen and 18.59% nitrogen compared to the calculated values of 47.06%, 3.29% and 18.30%, respectively.

In a similar manner other thiosemicarbazides can be prepared of which the following are representative:

4-normalpropyl-1-(5-nitro-2-furoyl)-thiosemicarbazide by the reaction of 5-nitro-2-furoylhydrazide and normalpropylisothiocyanate.

4-isopropyl-1-(5-nitro-2-furoyl)-thiosemicarbazide by the reaction of 5-nitro-2-furoylhydrazide and isopropylisothiocyanate.

4-normalbutyl-1-(5-nitro-2-furoyl)-thiosemicarbazide by the reaction of 5-nitro-2-furoylhydrazide and normalbutylisothiocyanate.

The new compounds of the present invention are important intermediates in the preparation of the corresponding thiadiazoles. In such use, the compounds are cyclized by treatment with concentrated sulfuric acid at or about 0° C. The thiosemicarbazides are also valuable as parasiticides. For such use, the products may be dispersed in water and employed as a spray. Alternatively, the compounds may be dispersed in an inert, finely divided solid and employed as dusts. The new compounds may likewise be employed as a constituent of oil-in-water emulsions with or without a wetting, dispersing or emulsifying agent. In representative operations, 4-ethyl-1-(5-nitro-2-furoyl)-thiosemicarbazide gave complete inhibition of the growth of *Micrococcus pyogenes* var. *aureus* and *Salmonella typhimurium* when employed as an aqueous composition containing 50 parts by weight of said compound per million parts by weight of ultimate mixture.

The embodiments of the invention in which an exclusive property or privilege is claimed are defined as follows:

1. A compound represented by the formula:

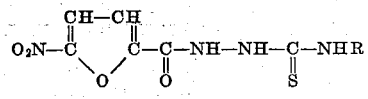

wherein R represents a member of the group consisting of hydrogen, phenyl and lower alkyl containing from 1 to 4 carbon atoms, inclusive.

2. 1-(5-nitro-2-furoyl)-thiosemicarbazide.
3. 4-methyl-1-(5-nitro-2-furoyl)-thiosemicarbazide.
4. 4-ethyl-1-(5-nitro-2-furoyl)-thiosemicarbazide.
5. phenyl-1-(5-nitro-2-furoyl)-thiosemicarbazide.

References Cited in the file of this patent

Yale et al.: J. Am. Chem. Soc. (1954), vol. 76, pp. 2208–11.